(12) United States Patent
Tripp (10) Patent No.: US 8,973,131 B2
(45) Date of Patent: *Mar. 3, 2015

(54) REFINEMENT-BASED SECURITY ANALYSIS

(71) Applicant: International Business Machines Corporation, Armonk, NY (US)

(72) Inventor: Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/667,288

(22) Filed: Nov. 2, 2012

(65) Prior Publication Data

US 2014/0130149 A1    May 8, 2014

(51) Int. Cl.
*G06F 11/00* (2006.01)
*G06F 11/36* (2006.01)
*H04L 29/06* (2006.01)

(52) U.S. Cl.
CPC ......... *G06F 11/3604* (2013.01); *H04L 63/1433* (2013.01)
USPC .......................................................... 726/22

(58) Field of Classification Search
CPC . H04L 63/1433; H04L 63/1441; H04L 9/002; G06F 22/3604; G06F 22/3608; G06F 21/577; G06F 11/3604; G06F 11/3608
USPC ................................ 726/22, 21, 25; 709/229
See application file for complete search history.

(56) References Cited

U.S. PATENT DOCUMENTS

| 7,058,925 | B2 | 6/2006 | Ball et al. |
| 7,784,035 | B2 | 8/2010 | Kahlon et al. |
| 7,849,509 | B2 | 12/2010 | Venkatapathy et al. |
| 7,900,193 | B1 * | 3/2011 | Kolawa et al. ................ 717/126 |
| 8,881,293 | B1 | 11/2014 | Brucker et al. |

(Continued)

OTHER PUBLICATIONS

Hardekopf, Semi-Sparse Flow-Sensitive Pointer Analysis, POPL'09, Jan. 18-24, 2009, pp. 1-13.

(Continued)

*Primary Examiner* — Thu Ha Nguyen
(74) *Attorney, Agent, or Firm* — Holland & Knight LLP; Brian J. Colandreo, Esq.; Jeffrey T. Placker, Esq.

(57) ABSTRACT

A method, computer program product, and computer system for assigning, by a computing device, a value to a first data-flow of a first summary associated with a control flow graph and assigning the value to a second data-flow of a second summary associated with the control flow graph. The first data-flow with the value is identified to flow into a type of sink. The second data-flow with the value is identified not to flow into the type of sink. The first summary of a behavior of the first data-flow is refined in response to identifying that the first data-flow does flow into the type of sink. Refinement of the second summary of a behavior of the second data-flow is skipped in response to identifying that the second data-flow does not flow into the type of sink.

10 Claims, 4 Drawing Sheets

(56) References Cited

U.S. PATENT DOCUMENTS

| | | | |
|---|---|---|---|
| 2005/0166167 A1* | 7/2005 | Ivancic et al. | 716/5 |
| 2007/0266164 A1* | 11/2007 | Balfanz et al. | 709/229 |
| 2008/0229286 A1 | 9/2008 | Kahlon | |
| 2009/0125887 A1* | 5/2009 | Kahlon et al. | 717/126 |
| 2011/0088016 A1 | 4/2011 | Ball et al. | |
| 2011/0126282 A1* | 5/2011 | Centonze et al. | 726/21 |
| 2011/0302559 A1 | 12/2011 | Naik | |
| 2012/0011492 A1* | 1/2012 | Sinha et al. | 717/132 |
| 2012/0167209 A1* | 6/2012 | Molnar et al. | 726/22 |
| 2013/0091578 A1* | 4/2013 | Bisht et al. | 726/25 |
| 2014/0090065 A1* | 3/2014 | Guarnieri et al. | 726/25 |
| 2014/0123293 A1* | 5/2014 | Tripp | 726/25 |
| 2014/0208430 A1 | 7/2014 | Guarnieri et al. | |

OTHER PUBLICATIONS

Nystrom et al., "Bottom-Up and Top-Down Context-Sensitive Summary-Based Pointer Analysis," http://www.crhc.uiuc.edu/Impact, downloaded on Nov. 2, 2012, pp. 1-17.

Hardekopf, "Flow-Sensitive Pointer Analysis for Millions of Lines of Code," IEEE, 2011, pp. 289-298.

* cited by examiner

REFINEMENT-BASED SECURITY ANALYSIS

TECHNICAL FIELD

This disclosure relates to security analysis and, more particularly, to refinement-based security analysis.

BACKGROUND

Information-flow analysis may include at least a portion of the infrastructure underlying, e.g., security products, verification tools, refactoring algorithms, and many other clients. Generally, an information-flow problem may be reduced to a graph-reachability problem, which may include, e.g., seeds (e.g., denoting information-flow start points), sinks (e.g., denoting information-flow end points), and downgraders (e.g., that may potentially block or transform the data-flow facts).

The graph supporting the information-flow analysis may describe how data-flow facts are propagated and transformed along code paths starting from the seeds, where the question asked by the analysis may include whether paths exist between seeds and sinks, and if so, which paths. For example, in security analysis, the seeds may be known as sources, which may represent statements reading untrusted inputs (e.g., the content of a file or an HTTP parameter). The downgraders may denote sanitization/validation operations performed by the application. A security violation may be reported if there is a flow from a source to a sink. An example issue regarding existing security analyses may include scalability. For instance, the analysis may need to track, e.g., information-flow paths across the entire application, including, for example, its underlying libraries, which may be intractable for modern industry-scale applications that may include (tens of) millions of lines of code.

SUMMARY OF DISCLOSURE

In one implementation, a method, performed by one or more computing devices, comprises assigning, by a computing device, a value to a first data-flow of a first summary associated with a control flow graph and assigning the value to a second data-flow of a second summary associated with the control flow graph. The first data-flow with the value is identified to flow into a type of sink. The second data-flow with the value is identified not to flow into the type of sink. The first summary of a behavior of the first data-flow is refined in response to identifying that the first data-flow does flow into the type of sink. Refinement of the second summary of a behavior of the second data-flow is skipped in response to identifying that the second data-flow does not flow into the type of sink.

One or more of the following features may be included. The type of sink may include a security sink. The value may indicate a skipped summary. The value may be assigned from a three value logic. Identifying that the first data-flow does flow into the type of sink may include identifying that the first data-flow is a security sensitive operation. The first summary of the behavior of the first data-flow may be refined a second time. A path of the first data-flow may be traversed backwards to identify each balanced paths across a method boundary where the first summary uses the value.

In another implementation, a computer program product resides on a computer readable storage medium that has a plurality of instructions stored on it. When executed by a processor, the instructions cause the processor to perform operations comprising assigning a value to a first data-flow of a first summary associated with a control flow graph and assigning the value to a second data-flow of a second summary associated with the control flow graph. The first data-flow with the value is identified to flow into a type of sink. The second data-flow with the value is identified not to flow into the type of sink. The first summary of a behavior of the first data-flow is refined in response to identifying that the first data-flow does flow into the type of sink. Refinement of the second summary of a behavior of the second data-flow is skipped in response to identifying that the second data-flow does not flow into the type of sink.

One or more of the following features may be included. The type of sink may include a security sink. The value may indicate a skipped summary. The value may be assigned from a three value logic. Identifying that the first data-flow does flow into the type of sink may include identifying that the first data-flow is a security sensitive operation. The first summary of the behavior of the first data-flow may be refined a second time. A path of the first data-flow may be traversed backwards to identify each balanced paths across a method boundary where the first summary uses the value.

In another implementation, a computing system includes a processor and a memory configured to perform operations comprising assigning a value to a first data-flow of a first summary associated with a control flow graph and assigning the value to a second data-flow of a second summary associated with the control flow graph. The first data-flow with the value is identified to flow into a type of sink. The second data-flow with the value is identified not to flow into the type of sink. The first summary of a behavior of the first data-flow is refined in response to identifying that the first data-flow does flow into the type of sink. Refinement of the second summary of a behavior of the second data-flow is skipped in response to identifying that the second data-flow does not flow into the type of sink.

One or more of the following features may be included. The type of sink may include a security sink. The value may indicate a skipped summary. The value may be assigned from a three value logic. Identifying that the first data-flow does flow into the type of sink may include identifying that the first data-flow is a security sensitive operation. The first summary of the behavior of the first data-flow may be refined a second time. A path of the first data-flow may be traversed backwards to identify each balanced paths across a method boundary where the first summary uses the value.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF ONE OR MORE IMPLEMENTATIONS

System Overview:

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
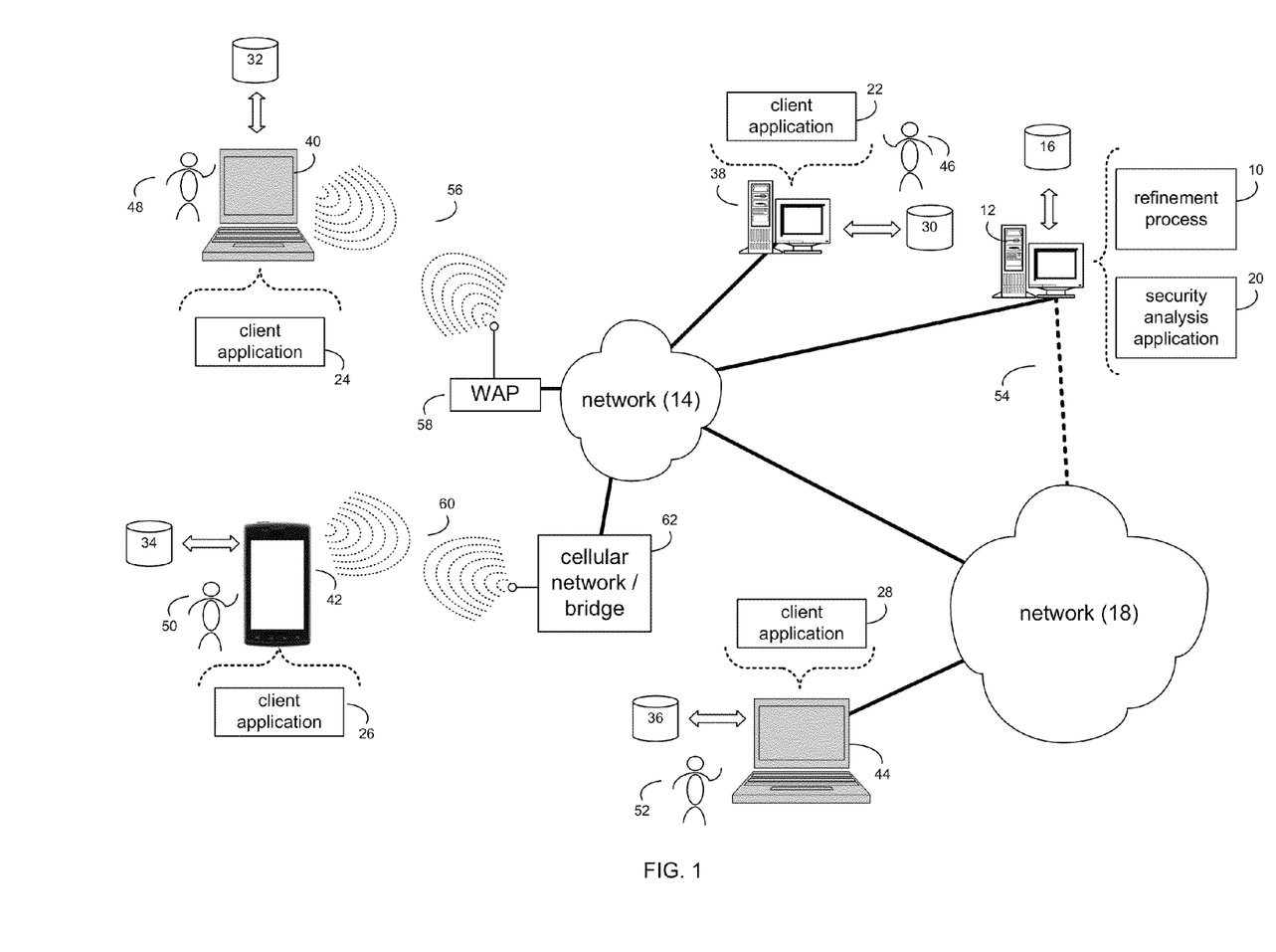
FIG. 1 is an illustrative diagrammatic view of a refinement process coupled to a distributed computing network according to one or more implementations of the present disclosure.

Referring to FIG. 1, there is shown refinement process 10 that may reside on and may be executed by a computer (e.g., computer 12), which may be connected to a network (e.g., network 14) (e.g., the internet or a local area network). Examples of computer 12 may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to Microsoft® Windows®; Mac® OS X®; Red Hat® Linux®, or a custom operating system, for example. (Microsoft and Windows are registered trademarks of Microsoft Corporation in the United States, other countries or both; Mac and OS X registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, refinement process 10 may assign a value to a first data-flow of a first summary associated with a control flow graph and may assign the value to a second data-flow of a second summary associated with the control flow graph. The first data-flow with the value may be identified to flow into a type of sink. The second data-flow with the value may be identified not to flow into the type of sink. The first summary of a behavior of the first data-flow may be refined in response to identifying that the first data-flow does flow into the type of sink. Refinement of the second summary of a behavior of the second data-flow may be skipped in response to identifying that the second data-flow does not flow into the type of sink.

The instruction sets and subroutines of refinement process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store 20, such as a database (e.g., relational database, object-oriented database, etc.) and may be located within any suitable memory location, such as storage device 16 coupled to computer 12. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Refinement process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute an application (e.g., security analysis application 20), examples of which may include, but are not limited to, e.g., a security application, a quality application, a life-cycle tool application, a security analysis application, at least a portion of an application to be analyzed, or any application that allows for the analysis of applications. Those skilled in the art will appreciate that the application to be analyzed via refinement process 10 and/or security analysis application 20 may be separate from, e.g., security analysis application 20. Refinement process 10 and/or security analysis application 20 may be accessed via client applications 22, 24, 26, 28. Refinement process 10 may be a stand alone application, or may be an applet/application/script that may interact with and/or be executed within security analysis application 20. Examples of client applications 22, 24, 26, 28 may include but are not limited to, e.g., a security application, a quality application, a life-cycle tool application, a security analysis application, at least a portion of an application to be analyzed, or any application that allows for the analysis of applications, a standard and/or mobile web browser, an email client application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a data-enabled, cellular telephone (not shown), a television (not shown), a smart television (not shown), and a dedicated network device (not shown). Client electronic devices 38, 40, 42, 44 may each execute an operating system, examples of which may include but are not limited to Android™, Apple® iOS®, Mac® OS X®; Red Hat® Linux®, or a custom operating system.

One or more of client applications 22, 24, 26, 28 may be configured to effectuate some or all of the functionality of refinement process 10 (and vice versa). Accordingly, refinement process 10 may be a purely server-side application, a purely client-side application, or a hybrid server-side/client-side application that is cooperatively executed by one or more of client applications 22, 24, 26, 28 and refinement process 10.

One or more of client applications 22, 24, 26, 28 may be configured to effectuate some or all of the functionality of security analysis application 20 (and vice versa). Accordingly, security analysis application 20 may be a purely server-side application, a purely client-side application, or a hybrid server-side/client-side application that is cooperatively executed by one or more of client applications 22, 24, 26, 28 and security analysis application 20.

Users 46, 48, 50, 52 may access computer 12 and refinement process 10 directly through network 14 or through secondary network 18. Further, computer 12 may be connected to network 14 through secondary network 18, as illustrated with phantom link line 54. Refinement process 10 may include one or more user interfaces, such as browsers and textual or graphical user interfaces, through which users 46, 48, 50, 52 may access refinement process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth™ is a telecommunications industry specification that allows, e.g., mobile phones, computers, smart phones, and other electronic devices to be interconnected using a short-range wireless connection.

Figure 2:
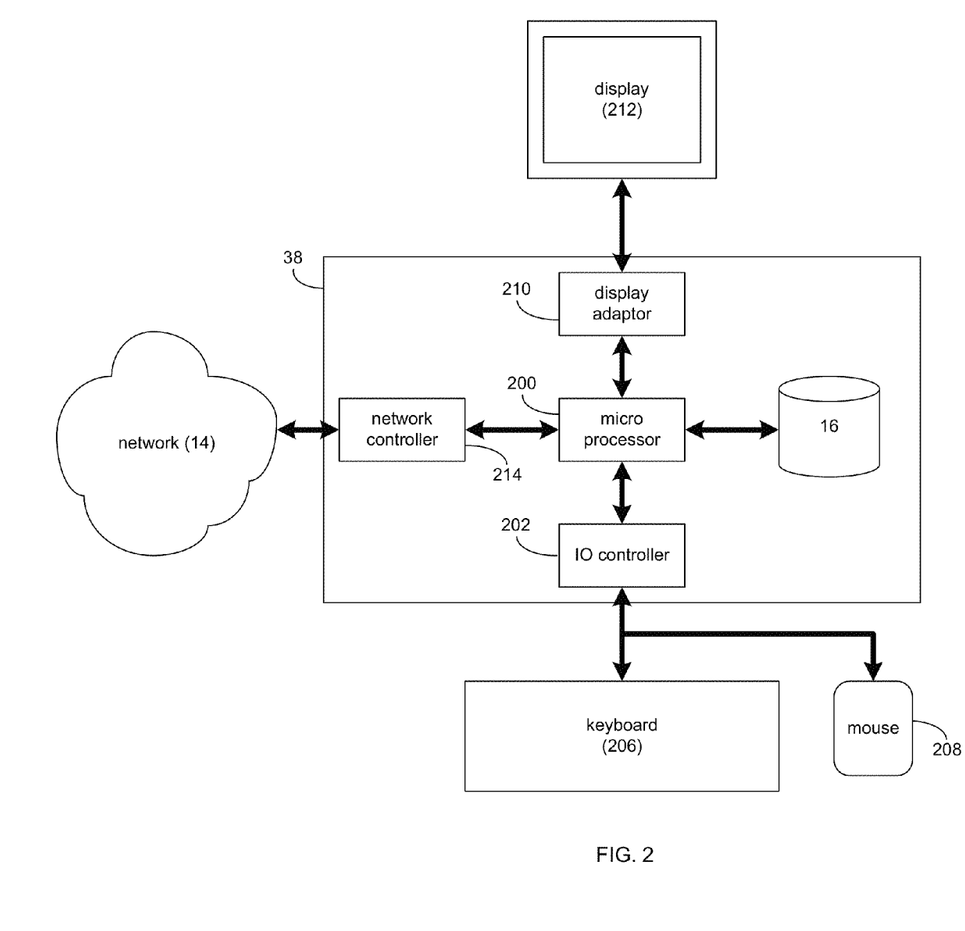
FIG. 2 is a diagrammatic view of the client electronic device of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configuration are possible. For example, any computing device capable of executing, in whole or in part, refinement process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device 16. An I/O controller (e.g., I/O controller 202) may be configured to couple microprocessor 200 with various devices, such as keyboard 206, pointing/selecting device (e.g., mouse 208), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

The Refinement Process:

As discussed above and referring also to FIGS. 3-4, refinement process 10 may assign 300 a value to a first data-flow of a first summary associated with a control flow graph and may assign 302 the value to a second data-flow of a second summary associated with the control flow graph. The first data-flow with the value may be identified 304 by refinement process 10 to flow into a type of sink. The second data-flow with the value may be identified 306 by refinement process 10 not to flow into the type of sink. The first summary of a behavior of the first data-flow may be refined 308 by refinement process 10 in response to identifying that the first data-flow does flow into the type of sink. Refinement of the second summary of a behavior of the second data-flow may be skipped 310 by refinement process 10 in response to identifying that the second data-flow does not flow into the type of sink.

Figure 4:
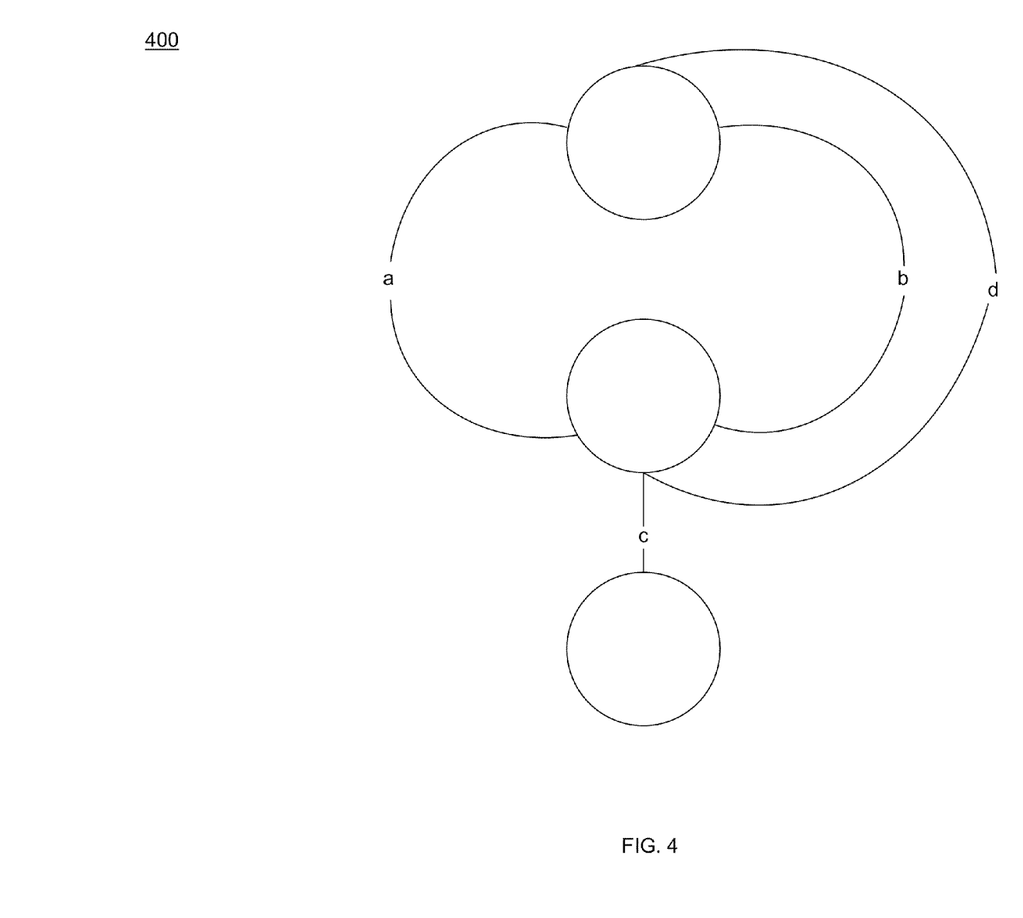
FIG. 4 is an illustrative simplified flow graph that may be used according to one or more implementations of the present disclosure.

Scalability enhancement for, e.g., static, vulnerability analysis may be accomplished via refinement process 10. As will be discussed further below, refinement process 10 may generate a control flow/call graph (e.g., graph 400) in which exploitable inputs may be identified. Refinement process 10 may apply, e.g., a 3-value logic (e.g., Kleene algebra), along the call graph to determine which control flows may have vulnerabilities arising from those inputs. Other portions of the graph may then be ruled out from further analysis by refinement process 10, thereby enabling the focus of valuable analysis resources on the prospectively vulnerable flows.

In some implementations, refinement process 10 may consider the (data-flow) behavior of, e.g., large, parts of a propagation graph as "unknown". As will be discussed further below, considering parts of a propagation graph as "unknown" may enable those parts to be skipped during analysis. In some implementations, to remain sound, refinement process 10 may not make an assertion on the behavior of those parts. By not making assertions as to the behavior of portions of the propagation graph considered to be unknown, at least in part, at least two outcomes may occur: (1) either this loss of information due to the skipped analysis has no effect on the precision of the analysis, which may be the case if, e.g., no "unknown" flow reaches a security sink, or (2) there are "unknown" flows reaching security-sensitive operations, in which case the sources of imprecision responsible for these flows may be discovered, and their behavior may be refined.

For instance, the following is an example of pseudo code (e.g., in Java) taken from a domain of security analysis:

```
public static void main(String[ ] args) {
    File f = new File(args[0]); // Source
    String userContents = readFileContents(f);
    DBUtil.write(userContents); // Sink
    File f = new File("config.dat"); // Benign
    String configContents = readFileContents(f);
    DBUtil.write(configContents); // Benign
}
public String readFileContents(File f) {
    collectStatistics(f);
    FileReader fr = new FileReader(f);
    Return fr.readToEnd( );
}
public void collectStatistics(File f) {
    /*
    * Computes various statistics related
    * to the input file.
    */
    ...
}
```

Figure 3:
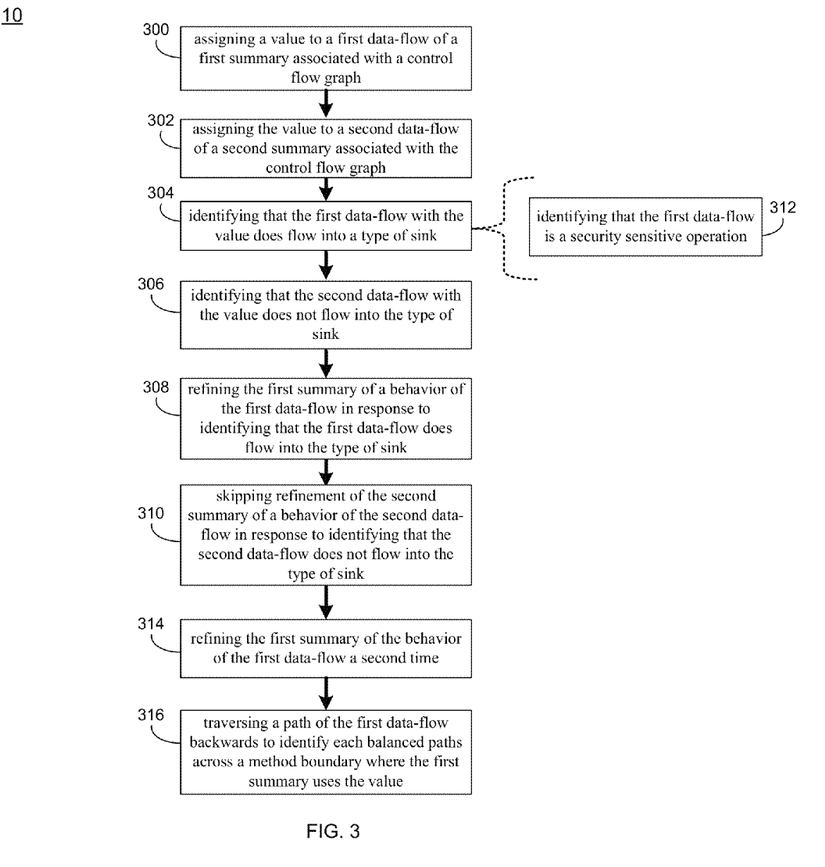
FIG. 3 is an illustrative flowchart of the refinement process of FIG. 1 according to one or more implementations of the present disclosure.

In some implementations, refinement process 10 may assign 300 a value to a first data-flow of a first summary associated with a control flow graph. As will be discussed in greater detail below, the value may be assigned 300/302 from a three value logic. The first data-flow with the value may be identified 304 by refinement process 10 to flow into a type of sink. The type of sink may include, e.g., a security sink. However, those skilled in the art will appreciate that the first data-flow may also be identified 304 as flowing into other types of sinks without departing from the scope of the disclosure.

Continuing with the above example, there are two data-flows. Both may read the content of a file and store it into, e.g., a backend data store. However, the first data-flow may be vulnerable, whereas the second data-flow may be benign. An "unknown" summary may be assigned to readFileContents, where whatever input it accepts (e.g., trusted and/or benign), the string returned may be assigned an "unknown" security status.

In some implementations, the "unknown" value may be used to provide a cheap yet conservative summary for methods not visited (e.g., skipped 310) by the analysis of refinement process 10. If the analysis finds a potential violation by establishing an uncertain flow of untrusted input to a security-sensitive operation, then refinement process 10 may refine 308 relevant coarse summaries.

For example, the above-noted first summary of a behavior of the first data-flow may be refined 308 by refinement process 10 in response to identifying 304 that the first data-flow does flow into the type of sink (e.g., security sink). In some implementations, identifying 304 that the first data-flow does flow into the type of sink may include identifying 312 that the first data-flow is a security sensitive operation (e.g., writing to a database). The sinks may represent security-sensitive operations.

Continuing with the above example, there may be two data-flows where "unknown" flows into a security sink, which may result in refinement 308. For example, refinement process 10 may, e.g., during refinement 308 of the first summary, include analysis that observes that the "unknown" values reaching the security sink calls emanate from the calls to readFileContents, and thus may build a more precise summary of the data-flow behavior of this method. Refinement process 10 may accomplish this, e.g., by treating its callee methods (e.g., collectStatistics and readToEnd) imprecisely, but modeling local data-flows within readFileContents precisely.

In some implementations, refinement process 10 may not determine (e.g., compute) a precise summary for collectStatistics. Instead, refinement process 10 may refine 308 portions of the propagation graph that are relevant from the perspective of vulnerable flows (e.g., data-flows that flow into a security sink) and need not refine portions of the propagation graph that are irrelevant from the perspective of vulnerable flows (e.g., data-flows that do not flow into a security sink).

In some implementations, refinement process 10 may be an extension of an abstract domain (typically) used by security analyses (e.g., using the Interprocedural, Finite, Distributive, Subset (IFDS) framework that may provide built-in facilities for call-to-return summaries), where data-flow facts may be access paths, and method summaries may distribute over access paths. Refinement process 10 may include an additional data-flow fact that models the "unknown" value, and may use it as a call-to-return initial summary for visited methods. Each round of the analysis by refinement process 10 may determine (up ahead) which methods may be treated as call-to-return, and this decision may be incrementally refined based on indefinite flows reaching security-sensitive operations.

In some implementations, the first summary of the behavior of the first data-flow may be refined 314 a second time by refinement process 10. For example, the source of imprecision may be readFileContents. Thus, the second (e.g., next) refinement round may enforce a more precise summary of this method. In some implementations, a path of the first data-flow may be traversed 316 backwards by refinement process 10 to identify each balanced paths across a method boundary where the first summary uses the value. In the example, refinement process 10 may be able to distinguish between the two calling contexts of readFileContents, and may need only to report one vulnerability, instead of two.

In general, only a fraction of the application being analyzed may be involved in relevant information flows. Furthermore, the backward slice from data-flow sinks may include only a small fraction of the entire propagation graph. This may imply that a majority of summaries that may be computed and explored by refinement process 10 may be irrelevant. Thus, refinement process 10 may assign 302 the value to a second data-flow of a second summary associated with the control flow graph, but refinement process 10 may identify 306 the second data-flow with the value does not flow into a security sink. As such, refinement process 10 may skip 310 refinement 308 of the second summary of a behavior of the second data-flow in response to identifying 306 that the second data-flow does not flow into the security sink. Advantageously, ignoring (e.g., skipping 310) these summaries may therefore result into a dramatic savings in analysis time and effort.

As discussed above, the value may be assigned 300/302 from a three value logic. For example, Kleene's three-valued logic may be used, which may include three truth values: 0, 1 and ½. These values may be organized according to the following lattice: $0<=½$, $1<=½$, and 0 and 1 are incomparable. In some implementations, the privileged value ½ may be the "unknown" value, which may model uncertainty (rather than "don't care"), and may be used by refinement process 10 to indicate skipped 310 summaries. Upon reaching a security-sensitive operation with an indefinite (or uncertain) value, the analysis of refinement process 10 may determine that one or more of the skipped 310 summaries may need to be refined 308. This may trigger a next analysis round where relevant methods may be removed from the "coarse summaries" list, and thus precise summaries may be determined (e.g., computed) for these methods.

For example, given the above-described information-flow analysis A and program P, refinement process 10 (e.g., via security analysis application 20) may:

1. Encode data-flow facts in A's domain as three-valued variables: $b1, \ldots, bn$.
2. Let all method summaries be "coarse", where a coarse summary is a mapping from all (3n) input values to the singleton mapping that transforms the input into $[b1=½, \ldots, bn=½]$.
3. Run A on P.
4. Find seed-to-sink flows where at least one of the data-flow facts arriving at the sink have value ½. If there are no such data-flows, quit.
5. For each such path, traverse the path backwards and find all balanced paths across a method boundary where the summary is coarse (using the ½ value).
6. Add one level of refinement to the found summaries.
7. Return to step 3.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer program product residing on a non-transitory computer readable storage medium having a plurality of instructions stored thereon which, when executed by a processor, cause the processor to perform operations comprising:
    assigning a value to a first data-flow of a first summary associated with a control flow graph and assigning the value to a second data-flow of a second summary associated with the control flow graph;
    identifying that the first data-flow with the value does flow into a type of sink, includes identifying that the first data-flow is a security sensitive operation;
    identifying that the second data-flow with the value does not flow into the type of sink;
    refining the first summary of a behavior of the first data-flow in response to identifying that the first data-flow does flow into the type of sink; and
    skipping refinement of the second summary of a behavior of the second data-flow in response to identifying that the second data-flow does not flow into the type of sink;
    wherein the type of sink includes a security sink.

2. The computer program product of claim 1 wherein the value indicates a skipped summary.

3. The computer program product of claim 1 further comprising refining the first summary of the behavior of the first data-flow a second time.

4. The computer program product of claim 1 wherein the value is assigned from a three value logic.

5. The computer program product of claim 1 further comprising traversing a path of the first data-flow backwards to identify each balanced paths across a method boundary where the first summary uses the value.

6. A computing system including a processor and a memory configured to perform operations comprising:
    assigning a value to a first data-flow of a first summary associated with a control flow graph and assigning the value to a second data-flow of a second summary associated with the control flow graph;
    identifying that the first data-flow with the value does flow into a type of sink, includes identifying that the first data-flow is a security sensitive operation;
    identifying that the second data-flow with the value does not flow into the type of sink;
    refining the first summary of a behavior of the first data-flow in response to identifying that the first data-flow does flow into the type of sink; and
    skipping refinement of the second summary of a behavior of the second data-flow in response to identifying that the second data-flow does not flow into the type of sink;
    wherein the type of sink includes a security sink.

7. The computing system of claim 6 wherein the value indicates a skipped summary.

8. The computing system of claim 6 further comprising refining the first summary of the behavior of the first data-flow a second time.

9. The computing system of claim 6 wherein the value is assigned from a three value logic.

10. The computing system of claim 6 further comprising traversing a path of the first data-flow backwards to identify each balanced paths across a method boundary where the first summary uses the value.

* * * * *